(12) United States Patent
Khalil et al.

(10) Patent No.: US 8,713,637 B2
(45) Date of Patent: Apr. 29, 2014

(54) DIAMETER SIGNALING FOR MOBILE IPV4

(75) Inventors: Mohamed Khalil, Murphy, TX (US);
Ahmad Muhanna, Richardson, TX (US); Haseeb Akhtar, Garland, TX (US)

(73) Assignee: Apple Inc., Cupertino, CA (US)

( * ) Notice: Subject to any disclaimer, the term of this patent is extended or adjusted under 35 U.S.C. 154(b) by 696 days.

(21) Appl. No.: 12/671,985

(22) PCT Filed: Aug. 12, 2008

(86) PCT No.: PCT/US2008/009646
§ 371 (c)(1),
(2), (4) Date: Feb. 3, 2010

(87) PCT Pub. No.: WO2009/023198
PCT Pub. Date: Feb. 19, 2009

(65) Prior Publication Data
US 2011/0191819 A1    Aug. 4, 2011

Related U.S. Application Data

(60) Provisional application No. 60/955,533, filed on Aug. 13, 2007, provisional application No. 60/956,550, filed on Aug. 17, 2007.

(51) Int. Cl.
*H04L 29/06* (2006.01)
*H04W 60/00* (2009.01)
*H04W 12/06* (2009.01)

(52) U.S. Cl.
CPC ........... *H04L 63/0892* (2013.01); *H04W 60/00* (2013.01); *H04W 12/06* (2013.01)

USPC .............................. 726/3; 713/168; 455/435.1

(58) Field of Classification Search
CPC ... H04L 63/0892; H04W 60/00; H04W 12/06
USPC .............................. 726/3; 713/168; 455/435.1
See application file for complete search history.

(56) References Cited

U.S. PATENT DOCUMENTS 6,956,846 B2  10/2005  Lewis et al.
7,152,238 B1  12/2006  Leung et al.

(Continued)

FOREIGN PATENT DOCUMENTS

EP    1 089 580 A2    4/2001
EP    1380150         1/2004

(Continued)

OTHER PUBLICATIONS

Calhoun, P. et al., "Diameter Mobile IPv4 Application", Network Working Group, RFC 4004, Aug. 2005, pp. 1-53.*

(Continued)

*Primary Examiner* — Michael Pyzocha
(74) *Attorney, Agent, or Firm* — Meyertons, Hood, Kivlin, Kowert & Goetzel, P.C.

(57) ABSTRACT

The invention consists of a new registration and authentication protocol for between a Mobile Node and a Home Agent. The new protocol uses a novel messaging sequence to request registration, authentication and authorization of the Mobile Node when it is located on a foreign network, and the novel protocol will avoid some of the standard registration and authentication protocol messages in order to eliminate the problems associated with re-transmission errors.

17 Claims, 2 Drawing Sheets

(56) References Cited

U.S. PATENT DOCUMENTS

| | | |
|---|---|---|
| 7,286,510 B2 | 10/2007 | Wang et al. |
| 7,548,981 B1 * | 6/2009 | Taylor et al. ............... 709/227 |
| 7,660,772 B2 | 2/2010 | Verkama |
| 8,121,597 B2 | 2/2012 | Tammi |
| 2001/0016492 A1 | 8/2001 | Igarashi et al. |
| 2001/0036164 A1 | 11/2001 | Kakemizu et al. |
| 2002/0006133 A1 * | 1/2002 | Kakemizu et al. ............ 370/401 |
| 2002/0080752 A1 | 6/2002 | Johansson et al. |
| 2004/0024901 A1 * | 2/2004 | Agrawal et al. ............... 709/238 |
| 2004/0032844 A1 | 2/2004 | Lewis et al. |
| 2006/0018291 A1 | 1/2006 | Patel et al. |
| 2006/0073840 A1 * | 4/2006 | Akgun et al. ............. 455/456.3 |
| 2007/0064903 A1 * | 3/2007 | Xiang ..................... 379/202.01 |
| 2010/0161986 A1 * | 6/2010 | Bucker et al. ................. 713/169 |

FOREIGN PATENT DOCUMENTS

| | | |
|---|---|---|
| JP | 2003-298634 A | 10/2003 |
| JP | 2004-048260 A | 2/2004 |
| JP | 2006-121647 A | 5/2006 |

OTHER PUBLICATIONS

Extended European Search Report in Application No. 08795251.1-2413, issued on Nov. 20, 2012, pp. 1-6.

Muhanna et al.; "MIPv4 Authentication Performance Using RADIUS and Diameter MIPv4 draft-muhanna-diameter-mip4-performance-00.txt;" IETF MIP4 Working Group Internet Draft, Jun. 28, 2007, retrieved from <http://tools.ietf.org/pdf/draft-muhanna-diameter-mip4-performance-00.pdf>; pp. 1-16.

* cited by examiner

DIAMETER SIGNALING FOR MOBILE IPV4

RELATED APPLICATION DATA

This application is related to Provisional Patent Application Ser. Nos. 60/955,533 filed on Aug. 13, 2007, and 60/956,550 filed on Aug. 17, 2007, and priority is claimed for this earlier filing under 35 U.S.C. §119(e). The Provisional patent application is also incorporated by reference into this utility patent application.

TECHNICAL FIELD OF THE INVENTION

A system and method for a mobile IP-based system, including an IP-based mobile communication system having a home network, foreign network and a mobile node.

BACKGROUND OF THE INVENTION

IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will always be associated with a single home network for IP addressing purposes. The home network has a Home Agent and the foreign network has a Foreign Agent—both of which control the routing of information packets into and out of their network.

The Mobile Node, Home Agent and Foreign Agent may be called other names depending on the nomenclature used on any particular network configuration or communication system. For instance, a "Mobile Node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like.

And, a home agent may be referred to as a Home Agent, Home Mobility Manager, Home Location Register, and a foreign agent may be referred to as a Foreign Agent, Serving Mobility Manager, Visited Location Register, and Visiting Serving Entity. The terms Mobile Node, Home Agent and Foreign Agent are not meant to be restrictively defined, but could include other mobile communication units or supervisory routing devices located on the home or foreign networks. Foreign networks can also be called serving networks.

Registering the Mobile Node

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent through the Foreign Agent. The registration request message will include a care-of address for the Mobile Node. A registration reply message may be sent to the Mobile Node by the Home Agent to confirm that the registration process has been successfully completed.

The Mobile Node keeps the Home Agent informed as to its current location by registering a "care-of address" with the Home Agent. The registered care-of address identifies the foreign network where the Mobile Node is located, and the Home Agent uses this registered care-of address to forward information packets to the foreign network for subsequent transfer onto the Mobile Node. If the Home Agent receives an information packet addressed to the Mobile Node while the Mobile Node is located on a foreign network, the Home Agent will transmit the information packet to the Mobile Node's current location on the foreign network using the applicable care-of address.

Authentication, Authorization and Accounting ("AAA")

In an IP-based mobile communications system, when a mobile node travels outside its home administrative domain, the mobile node may need to communicate through multiple domains in order to maintain network connectivity with its home network. While connected to a foreign network controlled by another administrative domain, network servers must authenticate, authorize and collect accounting information for services rendered to the mobile node. This authentication, authorization, and accounting activity is called "AAA", and AAA servers on the home and foreign network perform the AAA activities for each network.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server will also provide the accounting function including tracking usage and charges for use of transmissions links between administrative domains.

Another function for the AAA server is to support secured transmission of information packets by storing and allocating security associations. Security associations refer to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared or secret key or appropriate public/private key pair, and a style of replay protection.

The current registration and authentication protocols are not efficient because they require the re-transmission of registration and authentication request messages in certain timeout situations. The re-transmission of the registration and authentication request messages may be unnecessary in these situations, and such a re-transmission of these messages may result in multiple request messages being transmitted onto the network when only one request message was needed.

SUMMARY OF THE INVENTION

The invention consists of a new registration and authentication protocol for between a Mobile Node and a Home Agent. The new protocol will use a novel messaging sequence to request registration, authentication and authorization of the Mobile Node when it is located on a foreign network, and the novel protocol will avoid some of the standard registration and authentication protocol messages in order to eliminate the problems associated with re-transmission errors.

The initial sequence of messaging in the protocol will be conducted between the Mobile Node, Foreign Agent, foreign AAA server and home network AAA server, before a registration request is allowed to be sent to the Home Agent. The initial registration request message is transmitted to the Home Agent only after the successful completion of the initial message sequence between the other components on the network. The home agent will exchange messages with its home agent AAA server to confirm authentication and authorization on the home network, and if successful, the home agent will respond to the registration request with a response that is sent back to the Mobile Node on the foreign network. The invention can be implemented using a new protocol application or using modified messages from prior registration applications.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
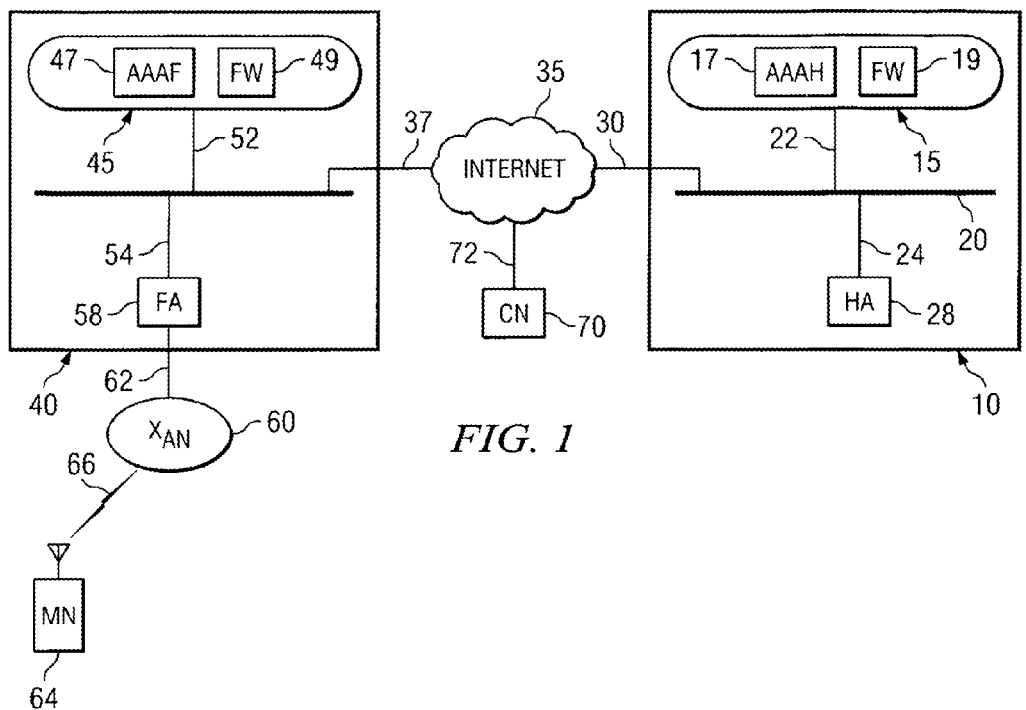
FIG. 1 is a mobile IP-based communication system as used in the present invention.

In FIG. 1, the overall architecture of the IP-based mobile system is shown with a Mobile Node 64, a home network 10 and a foreign network 40. As shown in FIG. 1, the home network 10 and the foreign network 40 are coupled to the Internet represented by the cloud 35. The home network 10 has a central buss line 20 coupled to the Home Agent 28 via communication link 24. The buss line 20 is coupled to the AAA server 17 via communication link 22. The home network 10 is coupled to the Internet 35 via communication link 30. A communications link is any connection between two or more nodes on a network or users on networks or administrative domains.

The foreign network 40 has a central buss line 50 coupled to the foreign agent 58 via communication link 54. The buss line 50 is coupled to the AAA foreign network server 47 via communication link 52. The foreign network 40 is coupled to the Internet 35 via communication link 37. Mobile Node 64 is shown electronically coupled to the foreign network 40 via the wireless communication link 66 of transceiver 60. Transceiver 60 is coupled to the foreign network 40 via communication link 62. The Mobile Node 64 can communicate with any transceiver or Access Network coupled to the foreign network 40.

The terms Home Agent and Foreign Agent may be as defined in the Mobile IP Protocol (RFC 2002), but these agents are not restricted to a single protocol or system. In fact, the term Home Agent, as used in this application, can refer to a Home Mobility Manager, Home Location Register, Home Serving Entity, or any other agent at a home network 10 having the responsibility to manage mobility-related functionality for a Mobile Node 64. Likewise, the term Foreign Agent, as used in this application, can refer to a Serving Mobility Manager, Visited Location Register, Visiting Serving Entity, or any other agent on a foreign network 40 having the responsibility to manage mobility-related functionality for a Mobile Node 64.

In the mobile IP communications system shown in FIG. 1, the Mobile Node 64 is identified by a permanent IP address. While the Mobile Node 64 is coupled to its home network 10, the Mobile Node 64 receives information packets like any other fixed node on the home network 10. When mobile, the Mobile Node 64 can also locate itself on foreign network 40. When located on foreign network 40, the home network 10 sends data communications to the Mobile Node 64 by "tunneling" the communications to the foreign network 40.

The Mobile Node 64 keeps the Home Agent 28 informed of its current location, or foreign network association, by registering a care-of address with the Home Agent 28. Essentially, the care-of address represents the foreign network 40 where the Mobile Node 64 is currently located. If the Home Agent 28 receives an information packet addressed to the Mobile Node 64 while the Mobile Node 64 is located on a foreign network 40, the Home Agent 28 will "tunnel" the information packet to foreign network 40 for subsequent transmission to Mobile Node 64.

The Foreign Agent 58 participates in informing the Home Agent 28 of the Mobile Node's 64 current care-of address. The Foreign Agent 58 also receives information packets for the Mobile Node 64 after the information packets have been forwarded to the Foreign Agent 58 by the Home Agent 28. Moreover, the Foreign Agent 58 serves as a default router for out-going information packets generated by the Mobile Node 64 while connected to the foreign network 40.

The Mobile Node 64 participates in informing the Home Agent 28 of its current care-of address. When the Mobile Node 64 is visiting a foreign network 40, the Mobile Node 64 obtains appropriate information regarding the address of the foreign network 40 and/or the Foreign Agent 58 from an agent advertisement. After obtaining this information, the Mobile Node 64 transmits the registration request to the Foreign Agent 58, which prepares the registration request message for forwarding to the Home Agent 28.

Mobile IP protocols require that the mobile node register the care-of address with the Home Agent 28 on the home network 10 after movement to a new foreign network 40. As part of the registration process, the Mobile Node 64 issues a registration request in response to power-up on the foreign network 40 or receipt of an agent advertisement. A registration request message can be sent to the home network 10 that includes a care-of address for the Mobile Node 64. A registration reply is issued by the home network 10 to acknowledge receipt of the registration request, confirm receipt of the care-of address for the Mobile Node 64, and indicate completion of the registration process.

The care-of address identifies the foreign network 40 where the Mobile Node 64 is located, and the Home Agent 28 uses this care-of address to tunnel information packets to the foreign network 40 for subsequent transfer to the Mobile Node 64. After registration is completed, the Home Agent 28 receives this communication and "tunnels" the message to the Mobile Node 64 on the foreign network 40. The Foreign Agent 58 accepts the re-directed communication and delivers the information packet to the Mobile Node 64 through the transceiver 60. In this manner, the information packets addressed to the Mobile Node 64 at its usual address on the home network 10 is re-directed or forwarded to the Mobile Node 64 on the foreign network 40. The Foreign Agent 58 may also serve as a router for "outbound" information packets generated by the Mobile Node 64 while connected to the foreign network 40 depending on the delivery style chosen.

Figure 2:
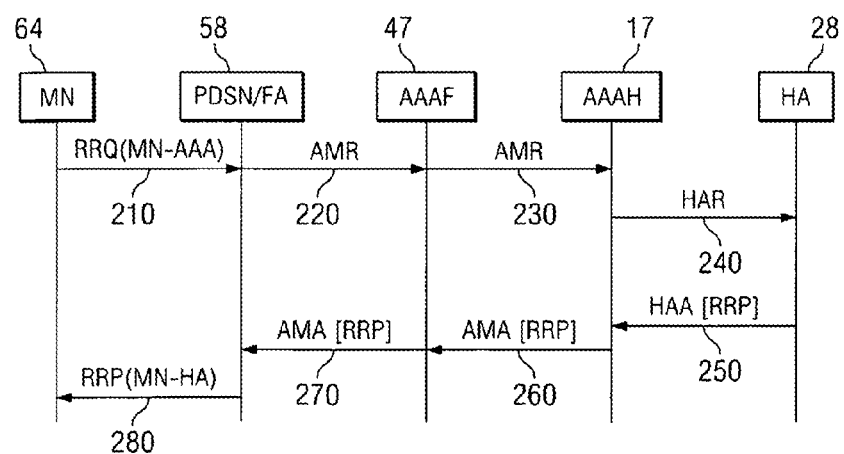
FIG. 2 is a message sequence for registration and authentication protocol used in the prior art.

FIG. 2 shows the message sequence using a known protocol (RF 4004) for the registration and authentication of the Mobile Node 64 on a foreign network. In step 210, the registration request RRQ is transmitted from the Mobile Node 64 to the Foreign Agent 58. The registration request RRQ message is received and a new registration message AMR is formed by the Foreign Agent 58, and, at step 220, that message is transmitted from the Foreign Agent 58 to the AAAF server 47 on the foreign network. The AMR message is transmitted from the AAAF server 47 to the AAAH server 17 at step 230, where a new registration request message HAR is generated and transmitted from the AAAH 17 to the Home Agent 28 at step 240.

The Home Agent 28 analyzes this HAR message before responding to that message with a registration response message HAA, which is transmitted back to the AAAH server 17 at step 250. The AAAH server 17 forms a new registration response message AMA at the AAAH server 17 and transmits that new registration response message AMA to the AAAF server 47 at step 260. The AAAF server 47 forwards the registration response message AMA to the Foreign Agent 58 at step 270, where a new registration response message RRP is formed. The Foreign Agent 58 transmits the new registration response message RRP to the Mobile Node 64 at step 280.

This known protocol uses three different registration messages and three different registration response messages, all transmitted sequentially in eight steps between five components. Delays may occur at any stage in the protocol sequence, and if the registration request or registration response messages are delayed to a substantial degree, the Mobile Node 64 may re-issue its registration request under the assumption that the prior registration request was lost or failed transmission. This re-issue and re-transmission of the registration request may be unnecessary, and could cloud the networks with registration messages that should not otherwise have been issued and transmitted. The present invention eliminates the possibility for such problems by simplifying the request and response message sequence for registration and authentication.

Figure 3:
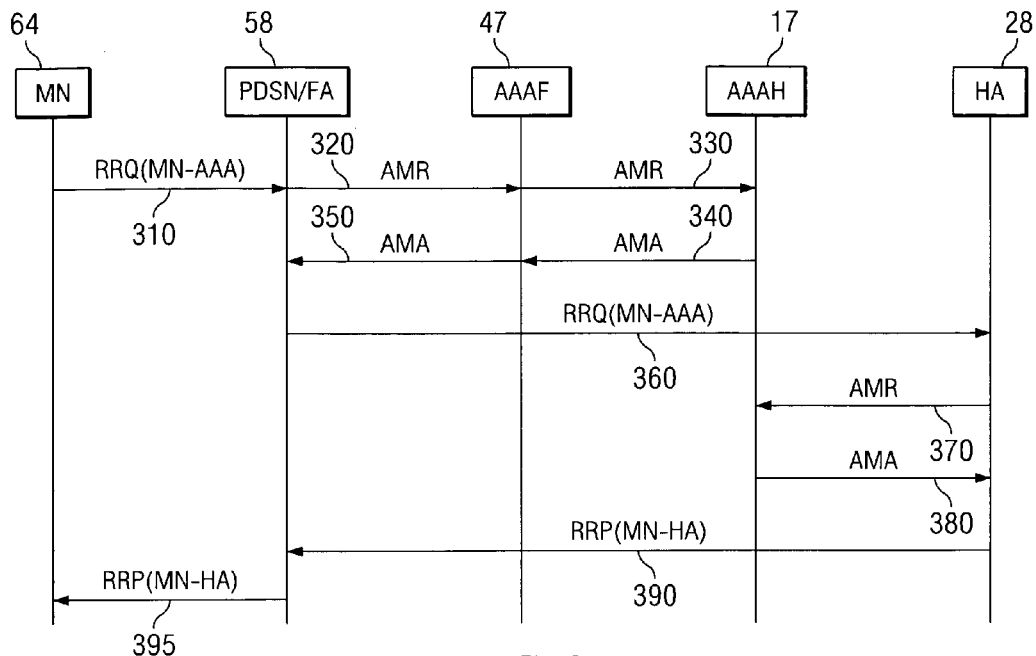
FIG. 3-4 are message sequences for the present invention.

FIG. 3 shows the message sequence using the present invention for the registration and authentication of the Mobile Node 64 on a foreign network. In step 310, the registration request RRQ is transmitted from the Mobile Node 64 to the Foreign Agent 58. The registration request RRQ message is received and a new registration message AMR is formed by the Foreign Agent 58, and the AMR message is transmitted from the Foreign Agent 58 to the AAAF server 47 on the foreign network at step 320. The AMR message is transmitted from the AAAF server 47 to the AAAH server 17 at step 330.

Instead of allowing the request messages to be communicated directly to the Home Agent, the initial message sequence first requires the AAAH 17 to analyze the request message AMR and then prepare a response message AMA that is transmitted from the AAAH 17 to AAAF 47 at step 340. The AAAF 47 transmits the response message AMA to the Foreign Agent 58 at step 350. The initial message sequence is finalized with the receipt of that AMA message at step 350.

After confirmation that the registration request has been approved and authenticated by the AAAH 17 through the AMA response message received by the Foreign Agent, the Foreign Agent forwards the registration request RRQ message initially received from the Mobile Node 64 directly to the Home Agent 28 at step 360. The Home Agent transmits an AMR request message to the AAAH 17 at step 370 based on the receipt of the request message RRQ, and the AAAH 17 responds to the AMR request message with the transmission of a registration response AMA message at step 380. With the receipt of the AMA message at step 380, the Home Agent 28 confirms the ability to register the Mobile Node 64.

After authentication and registration at the Home Agent 28, the Home Agent 28 transmits a registration response message RRP to the Foreign Agent 58 at step 390, and the Foreign Agent 58 forwards this registration response message to the Mobile Node 64 at step 395. With the receipt of the registration response message RRP by the Mobile Node 64, the registration and authentication protocol is completed. This protocol uses a reduced number of different message formats (four formats) compared to the prior art protocol, which assists in the reduction in the possibility that delays would occur and these delays would initiate re-transmissions of the registration request message.

Figure 4:
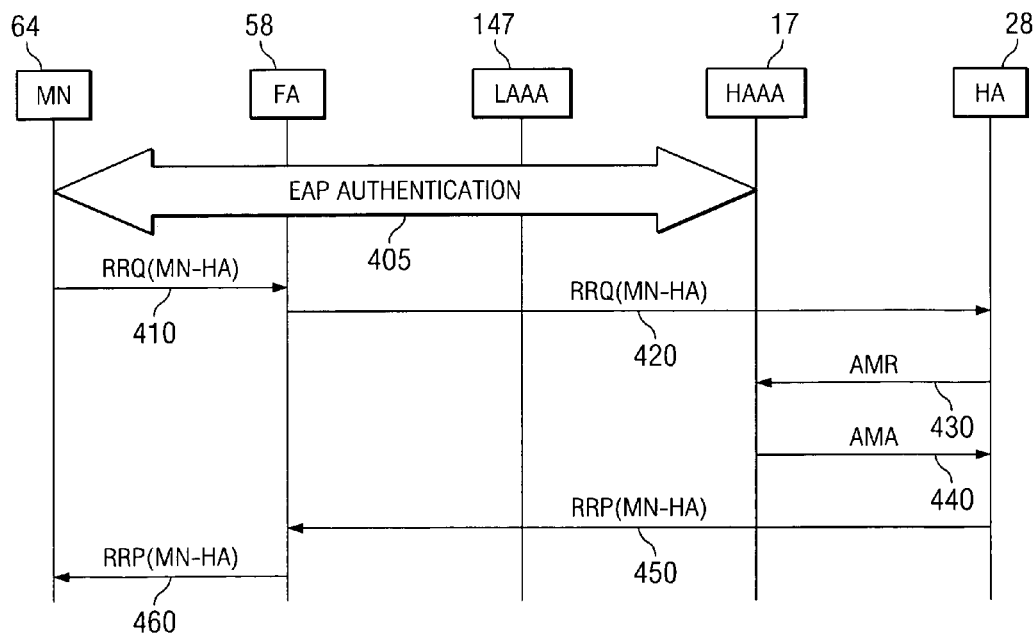

FIG. 4 shows the message sequence using the present invention for the registration and authentication of the Mobile Node 64 on a foreign network. In step 405, the initial message sequence is designated by the EAP Authentication communicated between the Mobile Node 64, Foreign Agent 58, LAAA 147 (corresponds to AAAF 47), and the HAAA 17. This EAP Authentication 405 allows the Mobile Node 64 to be authenticated by the HAAA 17 through an initial sequence of messages. Instead of allowing the request messages to be communicated directly to the Home Agent, the initial message sequence first requires the AAAH 17 to analyze the request message and confirm authentication back to components on the foreign network 40.

After step 405, the registration request RRQ is transmitted from the Mobile Node 64 to the Foreign Agent 58 at step 410. After confirmation that the registration request has been approved and authenticated by the AAAH 17 through the EAP Authentication 405, the Foreign Agent forwards the registration request RRQ message initially received from the Mobile Node 64 directly to the Home Agent 28 at step 420. The Home Agent transmits an AMR request message to the AAAH 17 at step 430 based on the receipt of the request message RRQ, and the AAAH 17 responds to the AMR request message with the transmission of a registration response AMA message at step 440. With the receipt of the AMA message at step 440, the Home Agent 28 confirms the ability to register the Mobile Node 64.

After authentication and registration at the Home Agent 28, the Home Agent 28 transmits a registration response message RRP to the Foreign Agent 58 at step 450, and the Foreign Agent 58 forwards this registration response message to the Mobile Node 64 at step 460. With the receipt of the registration response message RRP by the Mobile Node 64, the registration and authentication protocol is completed. This protocol uses a reduced number of different message formats (four formats) compared to the prior art protocol, which assists in the reduction in the possibility that delays would occur and these delays would initiate re-transmissions of the registration request message.

Having described the invention, we claim:

1. A method for registration and authentication of a mobile node on a foreign network comprising:

a foreign agent on the foreign network initiating an initial sequence of first registration messages to one or more Authentication, Authorization and Accounting (AAA) servers of a home network of the mobile node to confirm authentication of the mobile node;

the foreign agent receiving a second registration request message from the mobile node;

the foreign agent transmitting the second registration request message to the home agent without transmission to said one or more AAA servers if the authentication of the mobile node is confirmed by responses received by the foreign agent to the initial sequence of first registration messages;

the foreign agent receiving a registration response to the second registration request message from the home agent upon confirmation by the home agent of the authentication of the mobile node through said one or more AAA servers; and the foreign agent transmitting the registration response to the second registration request message to the mobile node.

2. The method of registration in claim 1, wherein said initiating the initial sequence comprises:

transmitting the initial message sequence from the foreign agent to a first AAA server on the foreign network.

3. The method of registration in claim 2, wherein the initial sequence of first registration messages includes the first AAA server on the foreign network transmitting the initial message sequence to a AAA server on the home network.

4. The method of registration in claim 3, wherein the initial sequence of first registration messages includes the AAA server on the home network transmitting a response to the initial message sequence to the foreign agent.

5. The method of registration in claim 1, further comprising:

preparing a mobile node for registration based on the information provided in the registration response received from the foreign agent.

6. The method of registration in claim 1, wherein the home agent confirms the authenticity of the registration request by a second message sequence with the home agent.

7. The method of registration in claim 6, wherein the second message sequence includes a third registration request message sent from the home agent to the AAA server on the home network.

8. The method of registration in claim 6, wherein the second message sequence includes a third registration response message sent from the AAA server to the home agent on the home network.

9. A communications network comprising:

a home network having a home agent coupled to a first of one or more Authentication, Authorization and Accounting (AAA) servers;

a foreign network having a foreign agent, the foreign network having the mobile node located thereon;

wherein the foreign agent is configured to:

initiate an initial message sequence between the foreign agent and the first AAA server, to confirm authentication of the mobile node;

receive a registration request message from the mobile node after confirmation of authentication of the mobile node;

transmit the registration request message to the home agent without transmission to said one or more AAA servers if the authentication of the mobile node is confirmed by response(s) received by the foreign agent in the initial message sequence;

receive a response to the registration request message from the home network upon confirmation by the home agent of the authentication of the mobile node through said one or more AAA servers; and transmit the response to the registration request to the mobile node.

10. A non-transitory, computer accessible memory medium storing program instructions for registration and authentication of a mobile node on a foreign network, wherein the program instructions are executable by a processor of a foreign agent to:

initiate an initial sequence of first registration messages to one or more Authentication, Authorization and Accounting (AAA) servers of a home network of the mobile node to confirm the authentication of the mobile node;

receive a second registration request message from the mobile node;

transmit the second registration request message to the home agent without transmission to said one or more AAA servers if the authentication of the mobile node is confirmed by responses received by the foreign agent to the initial sequence of first registration messages;

receive a registration response to the second registration request message from the home agent upon confirmation by the home agent of the authentication of the mobile node through said one or more AAA servers; and transmit the registration response to the second registration request message to the mobile node.

11. The non-transitory, computer accessible memory medium of registration in claim 10, wherein said initializing the initial sequence comprises:

transmitting the initial message sequence from the foreign agent to a first AAA server on the foreign network.

12. The non-transitory, computer accessible memory medium of registration in claim 10, wherein the initial sequence of first registration messages includes the first AAA server on the foreign network transmitting the initial message sequence to a AAA server on the home network.

13. The non-transitory, computer accessible memory medium of registration in claim 12, wherein the initial sequence of first registration messages includes the AAA server on the home network transmitting a response to the initial message sequence to the foreign agent.

14. The non-transitory, computer accessible memory medium of registration in claim 10, wherein the program instructions are further executable to:

prepare a mobile node for registration based on the information provided in the registration response received from the foreign agent.

15. The non-transitory, computer accessible memory medium of registration in claim 10, wherein the home agent confirms the authenticity of the registration request by a second message sequence with the home agent.

16. The non-transitory, computer accessible memory medium of registration in claim 15, wherein the second message sequence includes a third registration request message sent from the home agent to the AAA server on the home network.

17. The non-transitory, computer accessible memory medium of registration in claim 15, wherein the second message sequence includes a third registration response message sent from the AAA server to the home agent on the home network.

* * * * *